United States Patent
Manuilov et al.

(10) Patent No.: US 10,275,738 B1
(45) Date of Patent: Apr. 30, 2019

(54) TECHNIQUES FOR HANDLING DEVICE INVENTORIES

(71) Applicant: Symantec Corporation, Mountain View, CA (US)

(72) Inventors: Konstantin Manuilov, Harjumaa (EE); Andres Puulinn, Mountain View, CA (US); Andrew Parshin, Harjumaa (EE)

(73) Assignee: SYMANTEC CORPORATION, Mountain View, CA (US)

( * ) Notice: Subject to any disclaimer, the term of this patent is extended or adjusted under 35 U.S.C. 154(b) by 352 days.

(21) Appl. No.: 14/969,388

(22) Filed: Dec. 15, 2015

(51) Int. Cl.
  *G06F 16/23* (2019.01)
  *G06Q 10/08* (2012.01)

(52) U.S. Cl.
  CPC ....... *G06Q 10/087* (2013.01); *G06F 16/2358* (2019.01)

(58) Field of Classification Search
  CPC .................. G06Q 10/087; G06F 17/30368
  USPC ........................................................ 705/28
  See application file for complete search history.

(56) References Cited

U.S. PATENT DOCUMENTS

| 7,979,530 B1* | 7/2011 | Lee ...................... H04L 41/0859 709/223 |
| 2009/0070237 A1* | 3/2009 | Lew ...................... G06Q 10/087 705/28 |

OTHER PUBLICATIONS

Microsoft Systems Management Server 2003 Concepts https://technet.microsoft.com/en-us/library/cc181384.aspx (Year: 2009, SMS 2003).*

* cited by examiner

*Primary Examiner* — A. Hunter Wilder
*Assistant Examiner* — Joseph M Mutschler
(74) *Attorney, Agent, or Firm* — Maschoff Brennan

(57) ABSTRACT

Techniques for handling device inventories are disclosed. In one embodiment, the techniques may be realized as a system for handling device inventories comprising one or more processors. The one or more processors may be configured to send an inventory request of a device. The inventory request may comprise identification information of the device. The one or more processors may further be configured to receive, in response to the inventory request, inventory information associated with the device. The one or more processors may further be configured to compare the received inventory information and current inventory information of the device. The one or more processors may further be configured to send differences between the received inventory information and the current inventory information.

20 Claims, 4 Drawing Sheets

US 10,275,738 B1

TECHNIQUES FOR HANDLING DEVICE INVENTORIES

FIELD OF THE DISCLOSURE

The present disclosure relates generally to device inventory systems, and, more particularly, to techniques for handling device inventories.

BACKGROUND OF THE DISCLOSURE

When an endpoint device is initially enrolled in a device inventory system, or when an endpoint device needs to update the device inventory system with its current inventory information, traditionally, full inventory information of the device will be sent to the device inventory system. Inventory collection can take significant amount of time. Typically, the server of the device inventory system needs to process the full inventory information of the device. When devices are enrolled in a batch, inventory data from all the devices may create "storms" on the server side.

In view of the foregoing, it may be understood that there may be significant problems and/or shortcomings with traditional device inventory systems.

SUMMARY OF THE DISCLOSURE

Techniques for handling device inventories are disclosed. In one embodiment, the techniques may be realized as a system for handling device inventories comprising one or more processors. The one or more processors may be configured to send an inventory request of a device. The inventory request may comprise identification information of the device. The one or more processors may further be configured to receive, in response to the inventory request, inventory information associated with the device. The one or more processors may further be configured to compare the received inventory information and current inventory information of the device. The one or more processors may further be configured to send differences between the received inventory information and the current inventory information.

In accordance with other aspects of this embodiment, the inventory request may be a request for an initial enrollment.

In accordance with other aspects of this embodiment, the identification information may comprise at least one of a make, a model, and a year of the device.

In accordance with other aspects of this embodiment, the received inventory information may be predicted inventory information based on the identification information of the device.

In accordance with other aspects of this embodiment, the one or more processors are further configured to scan the device to obtain the current inventory information of the device.

In accordance with other aspects of this embodiment, at least one of the received inventory information and the current inventory information may comprise hard ware and software information of the device.

In accordance with other aspects of this embodiment, the one or more processors are further configured to display at least one of the received inventory information and the current inventory information.

In another embodiment, the techniques may be realized as method for handling device inventories. According to the method, an inventory request of a device may be received. The inventory request may comprise identification information of the device. In response to the inventory request, inventory information associated with the device may be received. The received inventory information and the current inventory information of the device may be compared. The received inventory information and the current inventory information may be compared.

In still another embodiment, the techniques may be realized as a non-transitory computer readable medium storing a computer-readable program for handling device inventories. The program may include computer-readable instructions to send an inventory request of a device. The inventory request may comprise identification information of the device. The program may further include computer-readable instructions to receive, in response to the inventory request, inventory information associated with the device. The program may further include computer-readable instructions to compare the received inventory information and current inventory information of the device. The program may further include computer-readable instructions to send differences between the received inventory information and the current inventory information.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, techniques for handling device inventories disclosed herein include, rather than reporting the full inventory information of a device, reporting only the "delta" inventory information that is different from the inventory information previously recorded by the device inventory system about the device. In one embodiment, if the device is enrolled in the device inventory system for the first time, "delta" inventory information that is different from the predicted inventory information based on identification information of the device (e.g., make, model, and year of the device) will be reported. Since only the "delta" inventory information is reported, redundant inventory reporting on inventory information that is already known for a specific device is avoided.

Figure 1:
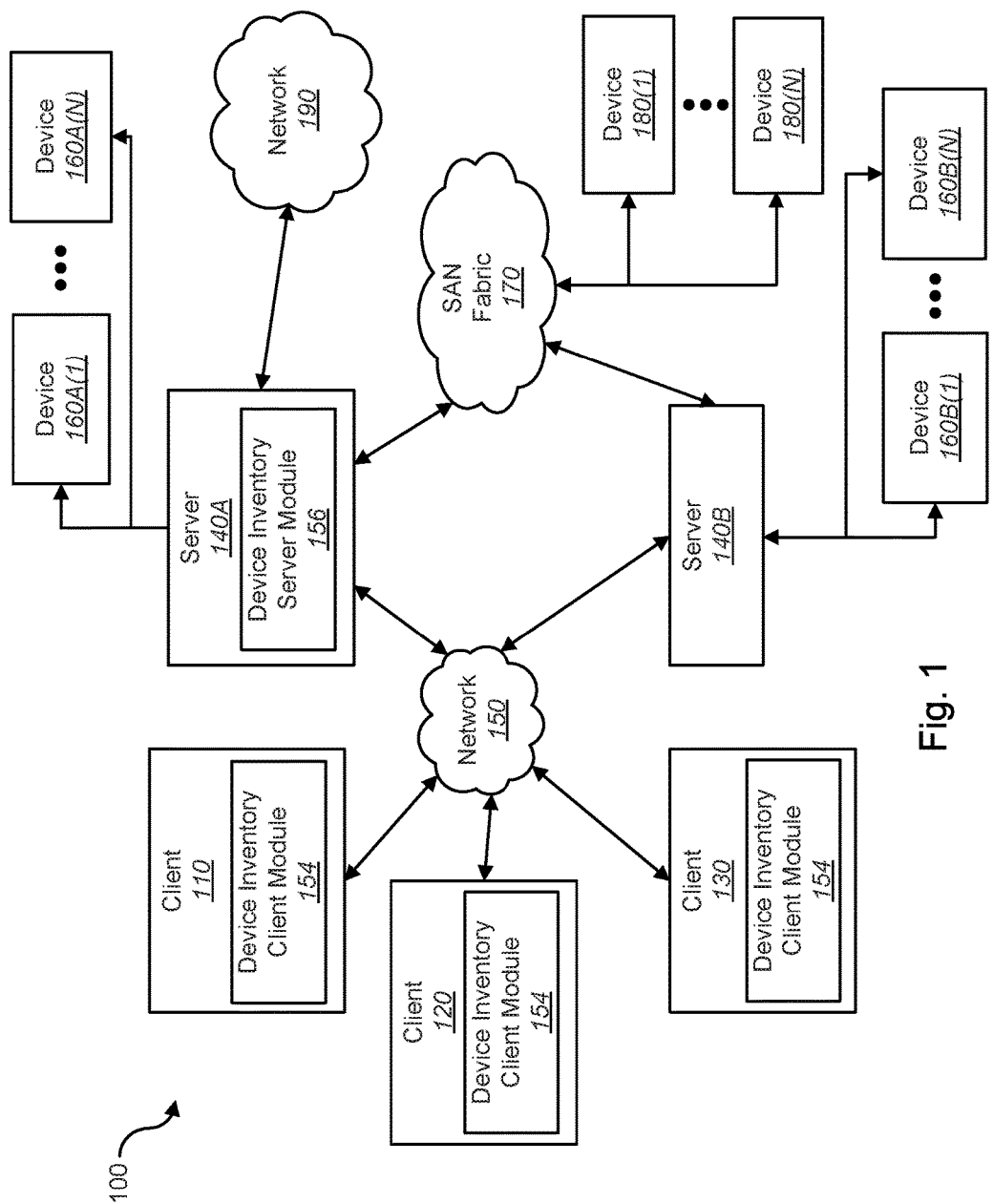
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
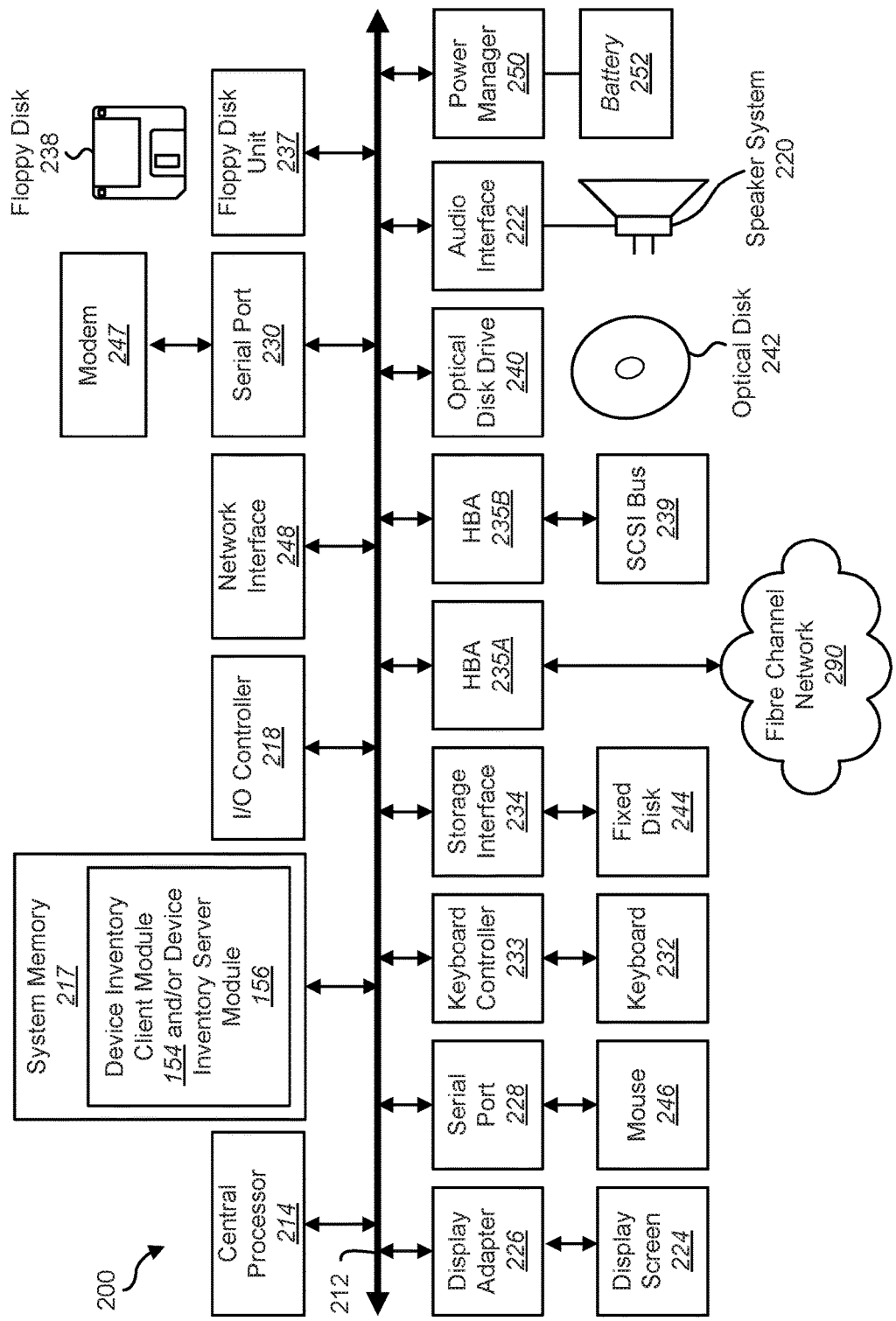
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, database servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more modules for implementation of device inventories such as, for example, device inventory client module 154. Server 140A may include one or more modules such as, for example, device inventory server module 156. Further, one or more portions of device inventory server module 156 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including device inventory client module 154 and/or device inventory server module 156 may be implemented as part of a cloud computing environment. For example, device inventory client module 154 may be distributed to various clients and servers through a cloud computer environment. For another example, device inventory client module 154 may be updated at the network centric location and then distributed to various clients and servers.

FIG. 2 shows a block diagram of a computer system 200 in accordance with an embodiment of the present disclosure. Computer system 200 may be suitable for implementing methods and systems in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, device inventory client module 154 and/or device inventory client module 156 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
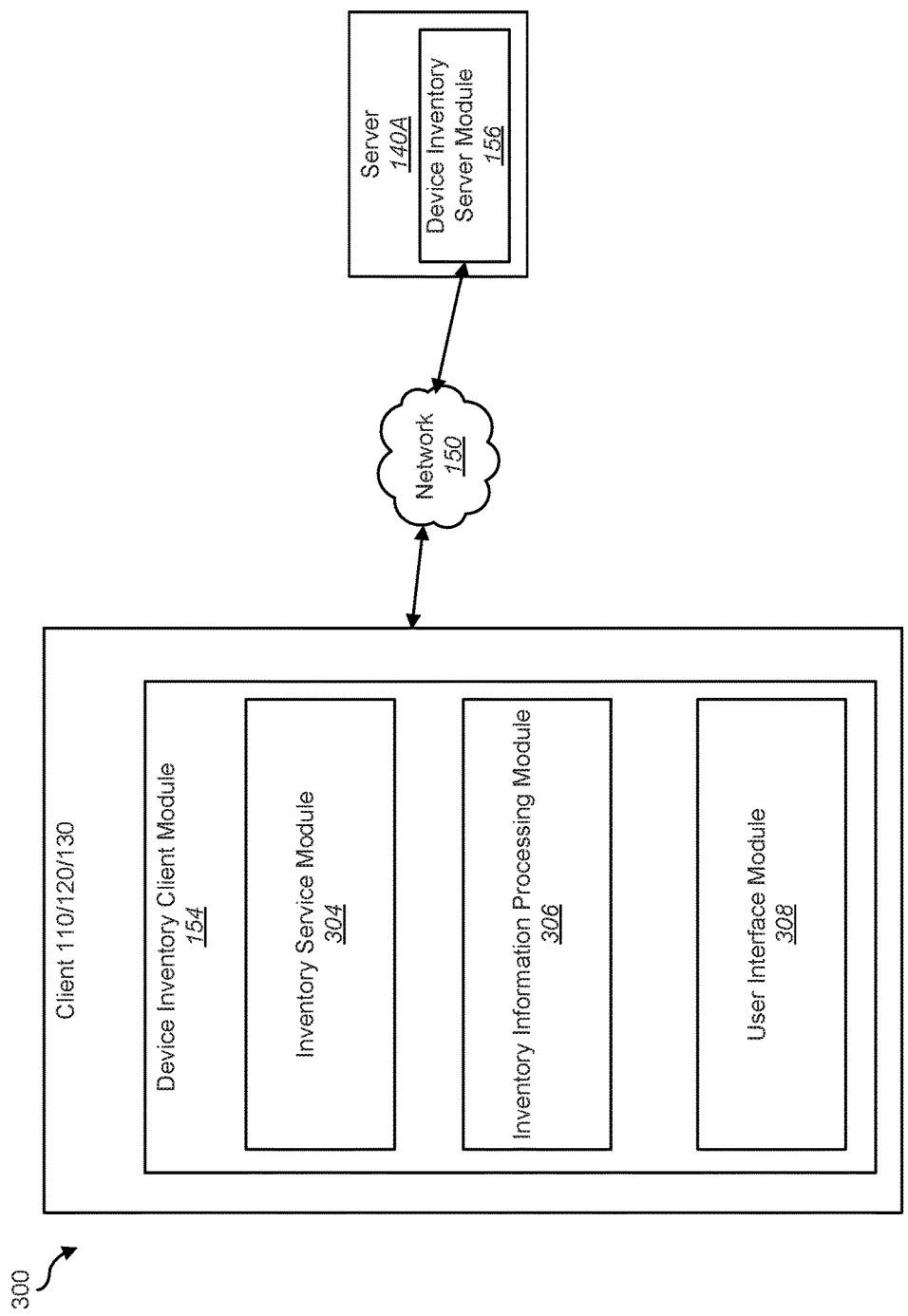
FIG. 3 shows a block diagram illustrating the device inventory system shown in FIG. 1 in accordance with an embodiment of the present disclosure.

FIG. 3 shows a block diagram illustrating the device inventory system shown in FIG. 1 in accordance with an embodiment of the present disclosure. Device inventory client module 154 may reside on a client, such as an end-user device, and/or another host, which is remote from the end-user device and communicates with the end-user device. In some embodiments, device inventory client module 154 includes inventory service module 304, inventory information processing module 306, and user interface module module 308. In some implementations, configuration module 304 communicates with server 140A. For example, inventory service module 304 may send an request of initial enrollment to server 140A. If the device has enrolled in the device inventory system, inventory service module 304 may send a request to update the device's current inventory information. In some embodiments, inventory service module 304 may send the update request periodically. In other embodiments, inventory service module 304 may send the update request after a triggering event, for example, after new hardware and/or software has been added to the device. In some implementations, in communications to the server 140A, device inventory client module 154 may identify the device, using identification information of the device, such as serial number, make, model, and year of the device. For example, device inventory client module 154 may identify the device as a laptop, 12345 (serial number), Lenovo (make), ThinkPad X250 (model), and 2014 (year).

In addition, in response to an initial enrollment request or an update request, inventory service module 304 may receive inventory information associated with the device from server 140A. In some embodiments, the received inventory information is the inventory information of the device that has been previously reported to the device inventory system and saved by the device inventory system. In other embodiments, the received inventory is the predicted inventory information based on the identification information of the device. For example, the device is identified as ThinkPad 250, and the predicted memory capacity for the device is 8 GB. In some implementations, the predicted inventory information is based on the standard hardware and software setup of a particular type of device. For example, the standard disk space for a Lenovo ThinkPad 250 might be 500 GB. For a device that is identified as a Lenovo ThinkPad 250, the predict inventory information would be 500 GB regarding the disk space of the device.

In addition, based on the output provided by inventory information processing module 306, inventory service module 304 may send the differences between the received inventory information and the current inventory information of the device.

Still referring to FIG. 3, in some implementations, inventory information processing module 306 may compare the differences between the received inventory information of the device and the current inventory information of the device and notify inventory service module 304 the differences. As described above, the inventory service module 306 may receive predicted inventory information of the device from server 140A. For example, the received predicted inventory information may list installed software as Office and Skype. Inventory information processing module 306 may compare the list of software currently installed on the device against the predicted list of software and notify inventory service module 304 the differences. For example, assuming besides Office and Skype, Box has been installed on the device, inventory information processing module 306 notifies inventory service module 304 that additional software Box has been installed. Inventory service module 304 then reports only the "delta" inventory information, in this case, with respect to software, Box. Inventory service module 304 does not report the full list of software—Office, Skype, and Box. In some embodiments, inventory information processing module 306 may scan the entire device or only a portion of the device to obtain the current inventory information of the device. In other embodiments, inventory information module 306 may keep records of hardware and software installations and use the records to obtain the current inventory information of the device.

With continued reference to FIG. 3, user interface module 308 may allow the user to enter an inventory request and display inventory information. For example, a user can request an initial enrollment of a new device through user interface module 308. Predicted inventory information received from server 140A and current inventory information obtained from inventory information processing module 306 may be displayed through user interface module 308.

With continued reference to FIG. 3, device inventory server module 156 may receive an inventory request of a device. Device inventory server module 156 may respond with the inventory information associated with the device. In some embodiments, device inventory server module 156 may respond with inventory information of the devices that has been reported and saved. In other embodiments, device inventory module 156 may respond with predicted inventory information of the device based on the identification information of the device. The identification information may include make, model, and year of the device. The predicted inventory information may be based on the standard hardware and software setup of a particular type of device. For example, server 104A may have predicted inventory information as follows in Table 1.

TABLE 1

Example standard hardware and software setup (i.e., predicated inventory information) based on manufacturer of a device

|  | Lenovo | Dell | HP |
| --- | --- | --- | --- |
| Memory (GB) | 4 | 2 | 4 |
| Disk (GB) | 500 | 320 | 1000 |
| Battery (mAh) | 7500 | 8000 | 4000 |
| Operating System | Windows 8.1 | Windows 7 | Windows 8.1 |
| Applications | Office, Skype | Office, Box | Office, Skype, Visio |

In addition, device inventory server module 156 may receive "delta" inventory information from device inventory client module 154. Device inventory server module 156 may update inventory information of the device at the server side by applying the "delta" inventory information upon previous recorded inventory information or predicted inventory information of the device.

Figure 4:
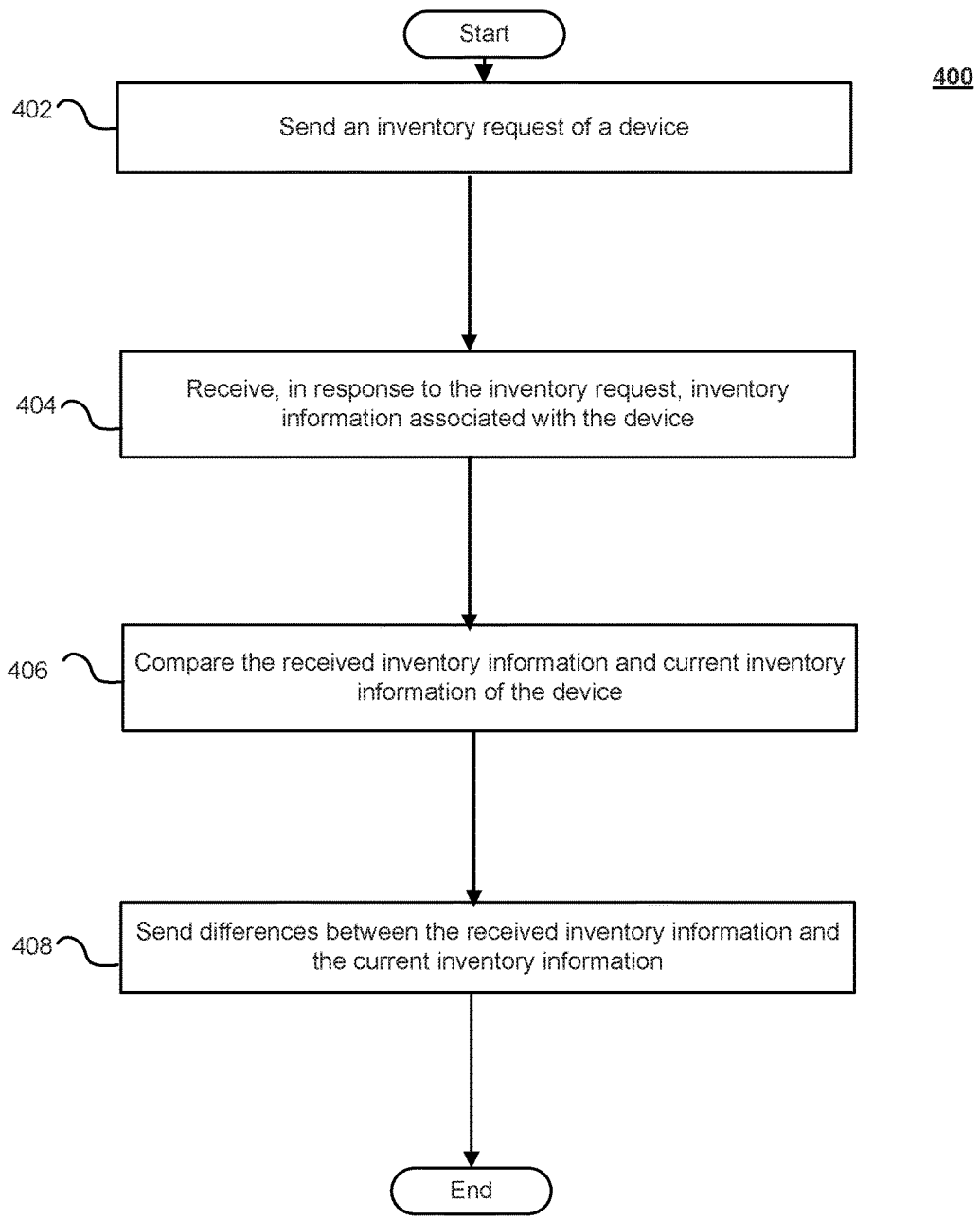
FIG. 4 shows a flowchart for handing device inventories in accordance with an example method of the present disclosure.

FIG. 4 shows a flowchart for handing device inventories in accordance with an example method of the present disclosure.

Method 400 may include sending an inventory request of a device (402); receiving, in response to the inventory request, inventory information associated with the device (404); comparing the received inventory information and current inventory information of the device (406); and sending differences between the received inventory information and the current inventory information (408). Method 400 is further described using Table 1 and an example device—Lenovo laptop—that is new to the device inventory system; and the device has 8 GB memory, 500 GB Disk, 7500 mAh battery, Windows 8.1, Office, Skype, and Box.

Method 400 may include sending an inventory request of a device (402). In some implementations, as described above, the inventory request may comprise identification information of the device. For example, the inventory request may be a request for initial enrollment of the device into the device inventory system. The device may be identified as a Lenovo laptop.

At step 404, inventory information associated with the device may be received. In some implementations, the inventory information may be predicted inventory information based on the identifying information of the device. For example, the inventory information is predicted inventory information indicating 4 GB memory, 500 GB Disk, 7500 mAh battery, Windows 8.1, Office, and Skype.

At step 406, differences between the received inventory information and the current inventory information of the device may be compared. For example, instead of 4 GB memory, the device has 8 GB memory. The device also has Box installed. The differences in memory capacity and additional software is captured.

At step 408, differences between the received inventory information and the current inventory information of the device may be sent. As described above, only the "delta" inventory information is sent to server 104A, for example, 8 GB memory and Box. Inventory information regarding 500 GB Disk, 7500 mAh battery, Windows 8.1, Office, and Skype will not be sent. At the server side, the "delta" inventory information is applied upon the previously recorded inventory information of the device or the predicted inventory information of the device to obtain full and updated inventory information of the device. For example, at the server side, the full and updated inventory information of the device is 8 GB memory, 500 GB Disk, 7500 mAh battery, Windows 8.1, Office, Skype, and Box.

At this point it should be noted that techniques for handling device inventories in accordance with the present disclosure as described above may involve the processing of input data and the generation of output data to some extent. This input data processing and output data generation may be implemented in hardware or software. For example, specific electronic components may be employed in an inventory service module, inventory information processing module, user interface module. or similar or related circuitry for implementing the functions associated with techniques for handling device inventories in accordance with the present disclosure as described above. Alternatively, one or more processors operating in accordance with instructions may implement the functions associated with techniques for handling device inventories in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for receiving initial enrollment of device inventories, the system comprising one or more processors configured to:
   send a server an initial enrollment inventory request of a device, wherein the initial enrollment inventory request comprises identification information of the device, including a manufacturer of the device;
   receive from the server, in response to the inventory request, predicted inventory information associated with the device, wherein the predicted inventory information identifies a standard hardware setup and a standard software setup based on the identification information of the device, including the manufacturer of the device;
   scan the device to obtain current inventory information of the device;
   compare the predicted inventory information with the current inventory information of the device to identify differences between the predicted inventory and the current inventory of the device; and
   send the server a portion of the current inventory information, the sent portion including only the differences between the predicted inventory information and the current inventory information.

2. The system of claim 1, wherein the identification information comprises at least one of a make, a model, and a year of the device.

3. The system of claim 1, wherein the current inventory information comprises hardware and software information of the device.

4. The system of claim 1, wherein the one or more processors are further configured to display at least one of the predicted inventory information and the current inventory information.

5. The system of claim 1, wherein the entire device is scanned to obtain the current inventory information of the device.

6. The system of claim 1, wherein the predicted inventory includes a standard disk space for the device.

7. The system of claim 1, wherein the predicted inventory includes a standard operating system for the device.

8. A computer-implemented method for receiving initial enrollment of device inventories, the method comprising:
   sending a server an initial enrollment inventory request of a device, wherein the initial enrollment inventory request comprises identification information of the device, including a manufacturer of the device;
   receiving from the server, in response to the inventory request, predicted inventory information associated with the device, wherein the predicted inventory information identifies a standard hardware setup and a standard software setup based on the identification information of the device, including the manufacturer of the device;
   scanning the device to obtain current inventory information of the device;
   comparing the predicted inventory information with the current inventory information of the device to identify differences between the predicted inventory and the current inventory of the device; and
   sending the server a portion of the current inventory information, the sent portion including only the differences between the predicted inventory information and the current inventory information.

9. The method of claim 8, wherein the identification information comprises at least one of a make, a model, and a year of the device.

10. The method of claim 8, wherein the current inventory information comprises hardware and software information of the device.

11. The method of claim 8, further comprising displaying at least one of the predicted inventory information and the current inventory information.

12. The method of claim 8, wherein the entire device is scanned to obtain the current inventory information of the device.

13. The method of claim 8, wherein the predicted inventory includes a standard disk space for the device.

14. The method of claim 8, wherein the predicted inventory includes a standard operating system for the device.

15. A non-transitory computer readable medium storing a computer-readable program for receiving initial enrollment of device inventories, comprising:
   computer-readable instructions to send a server an initial enrollment inventory request of a device, wherein the inventory request comprises identification information of the device, including a manufacturer of the device;
   computer-readable instructions to receive from the server, in response to the inventory request, predicted inventory information associated with the device, wherein the predicted inventory information identifies a standard hardware setup and a standard software setup based on the identification information of the device, including the manufacturer of the device;
   computer-readable instructions to scan the device to obtain current inventory information of the device;
   computer-readable instructions to compare the predicted inventory information with the current inventory information of the device to identify differences between the predicted inventory and the current inventory of the device; and
   computer-readable instructions to send the server a portion of the current inventory information, the sent portion including only the differences between the predicted inventory information and the current inventory information.

16. The non-transitory computer readable medium according to claim 15, wherein the identification information comprises at least one of a make, a model, and a year of the device.

17. The non-transitory computer readable medium according to claim 15, wherein the current inventory information comprises hardware and software information of the device.

18. The non-transitory computer readable medium according to claim 15, wherein the entire device is scanned to obtain the current inventory information of the device.

19. The non-transitory computer readable medium according to claim 15, wherein the predicted inventory includes a standard disk space for the device.

20. The non-transitory computer readable medium according to claim 15, wherein the predicted inventory includes a standard operating system for the device.

* * * * *